UNITED STATES PATENT OFFICE.

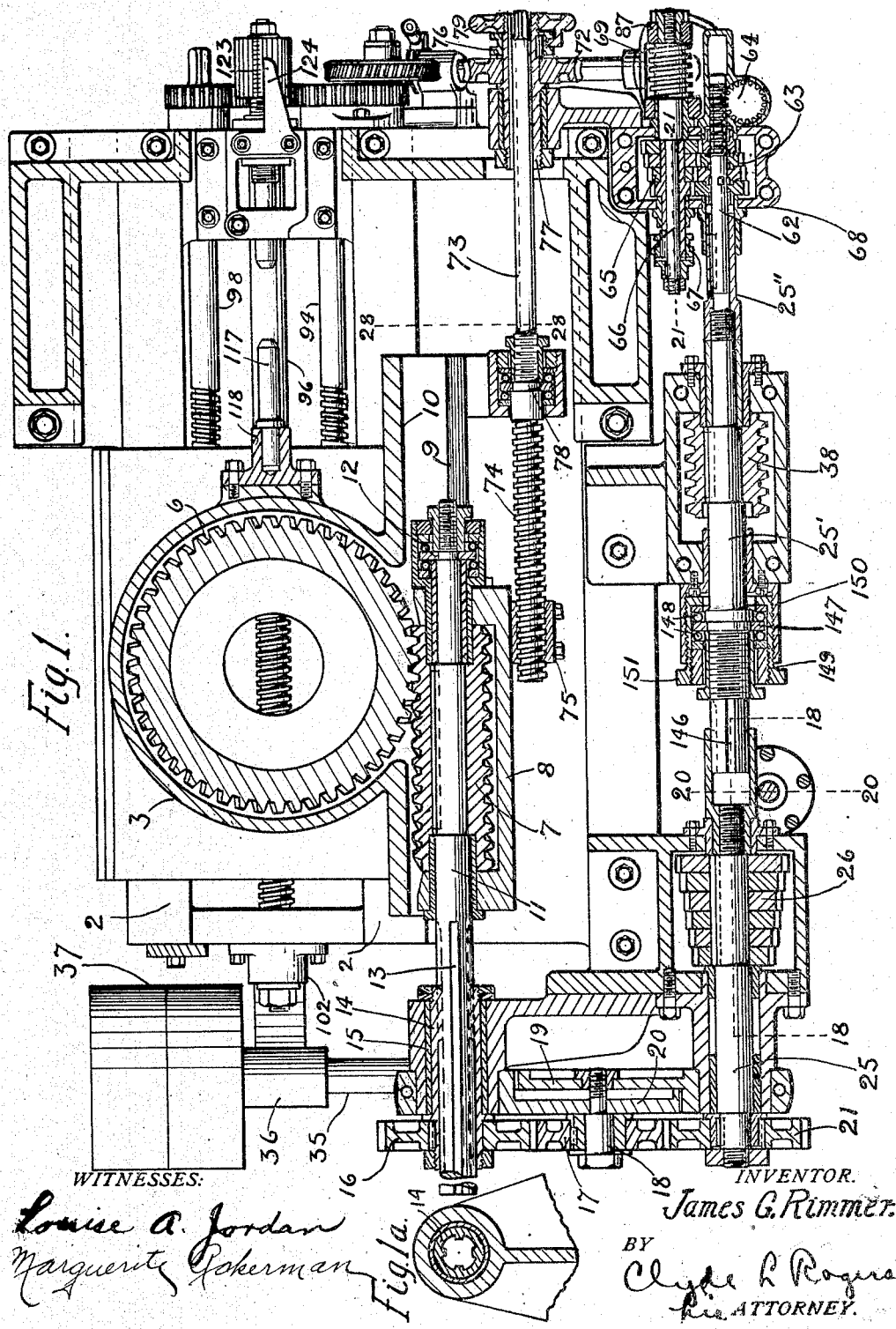

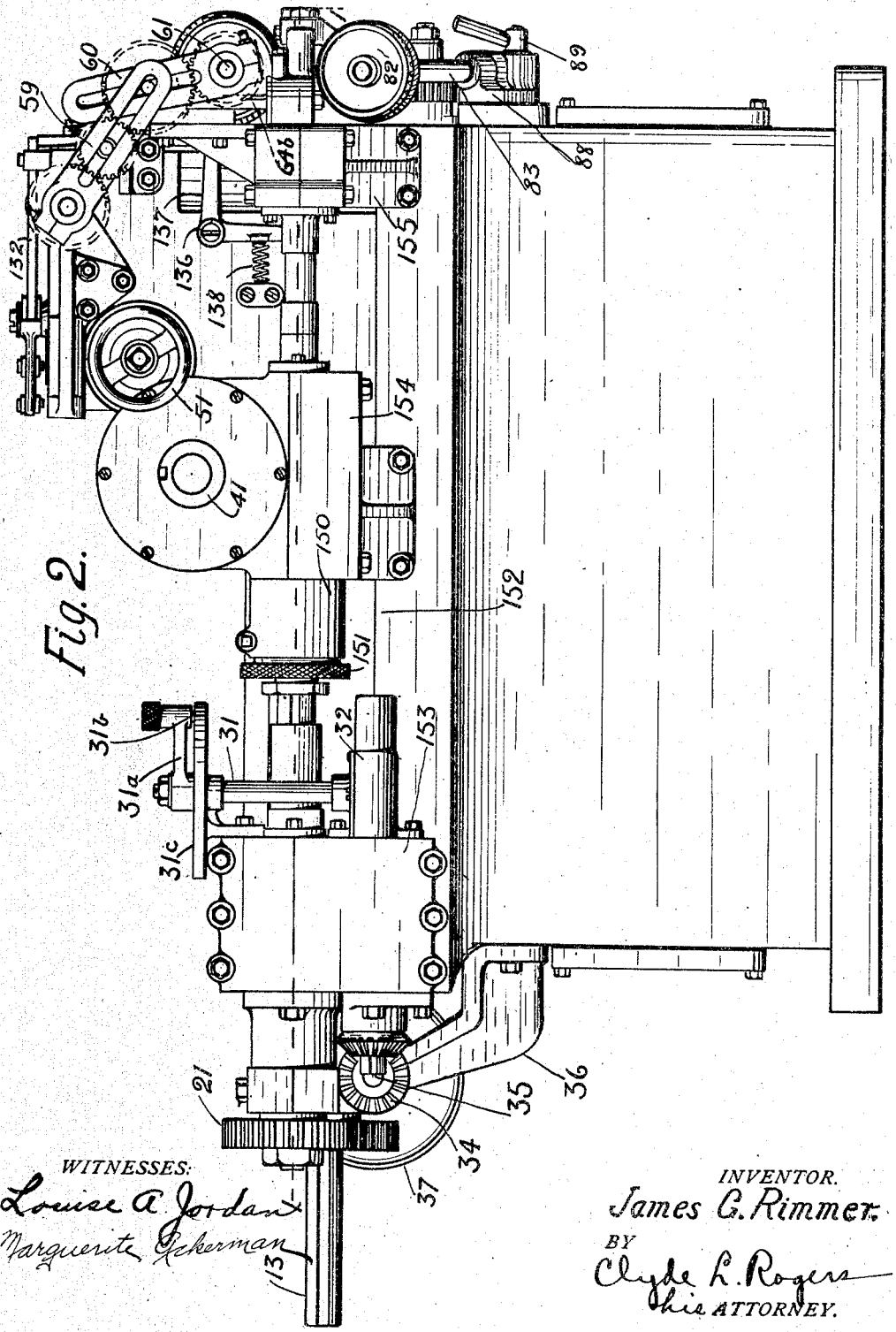

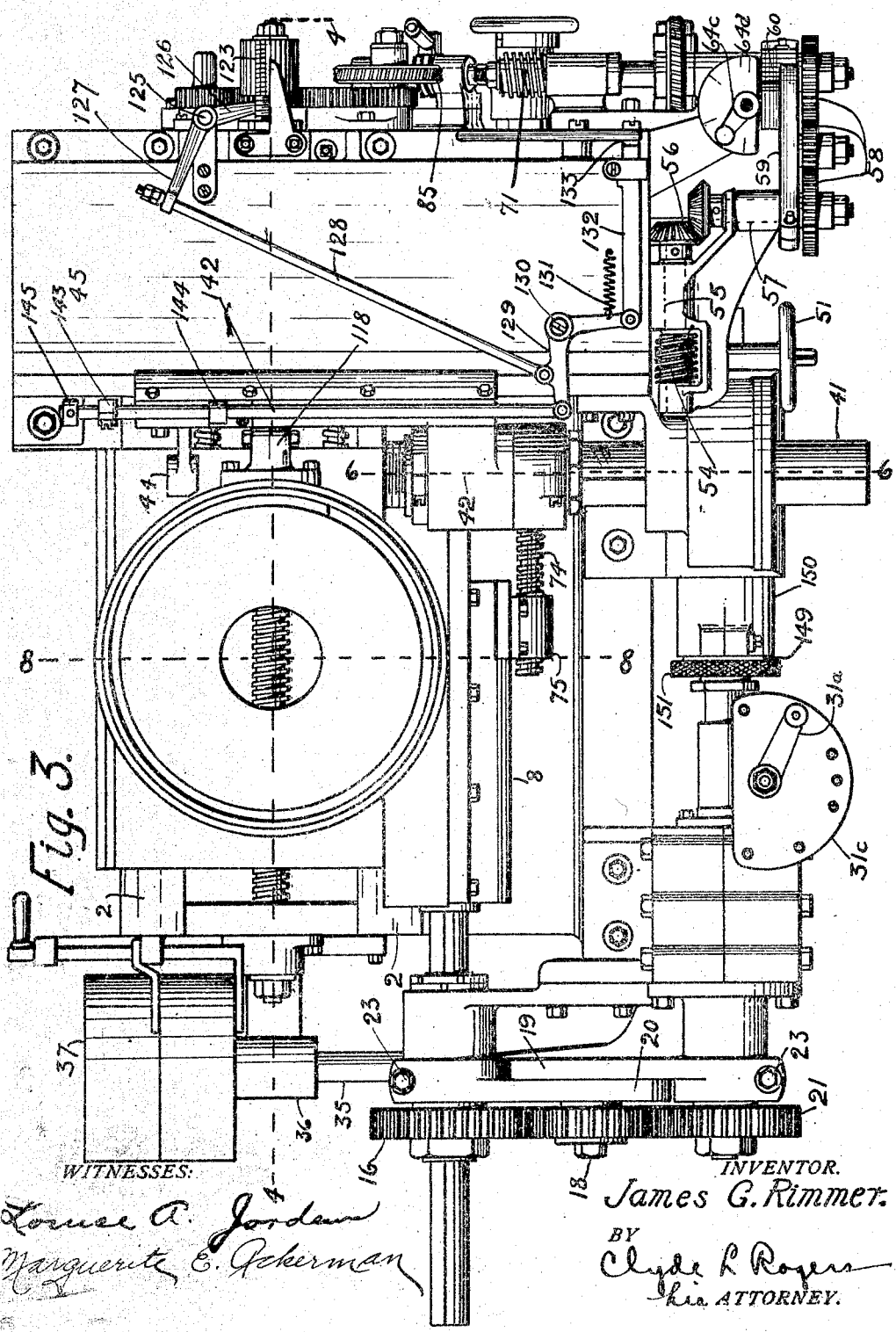

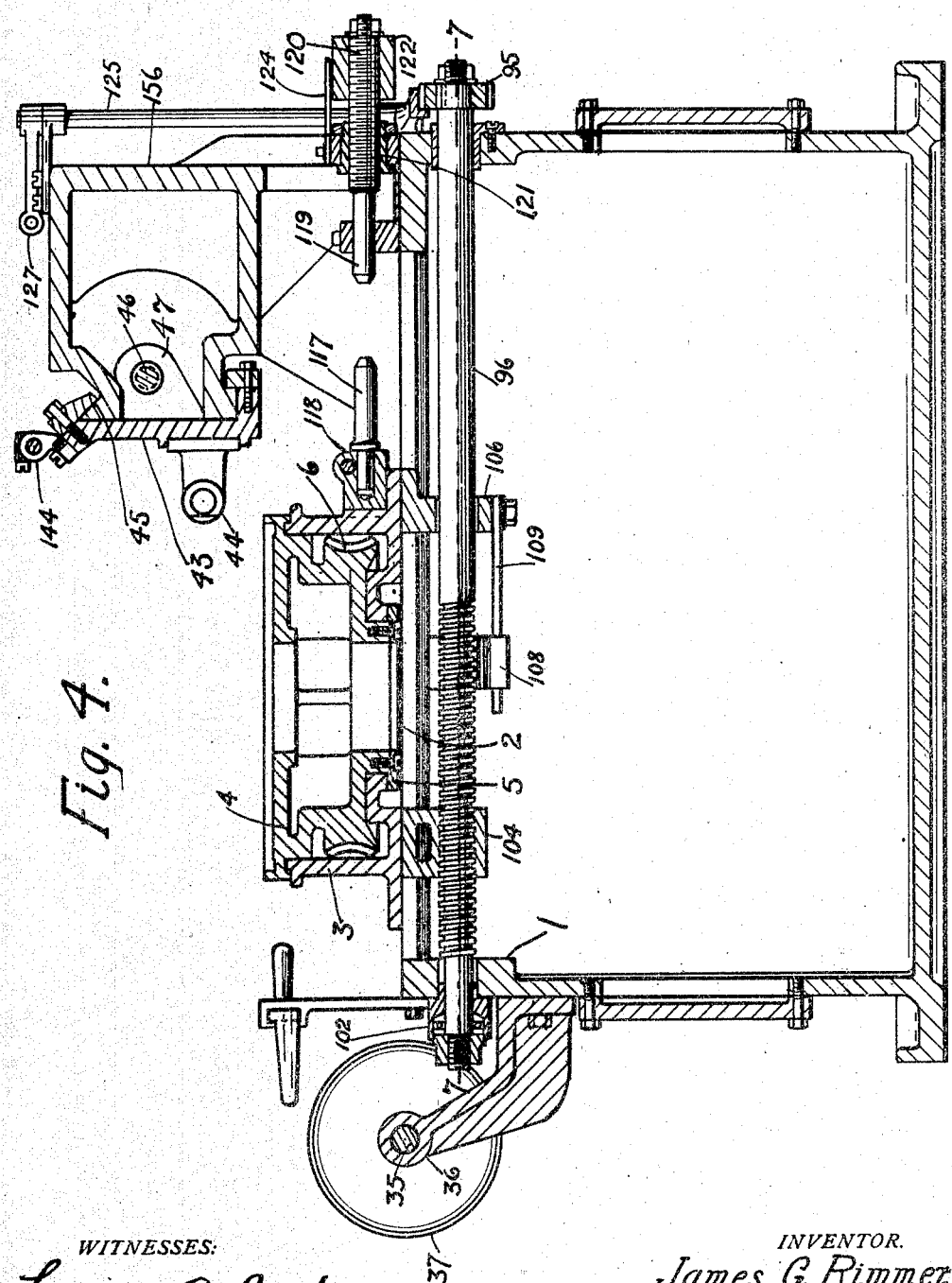

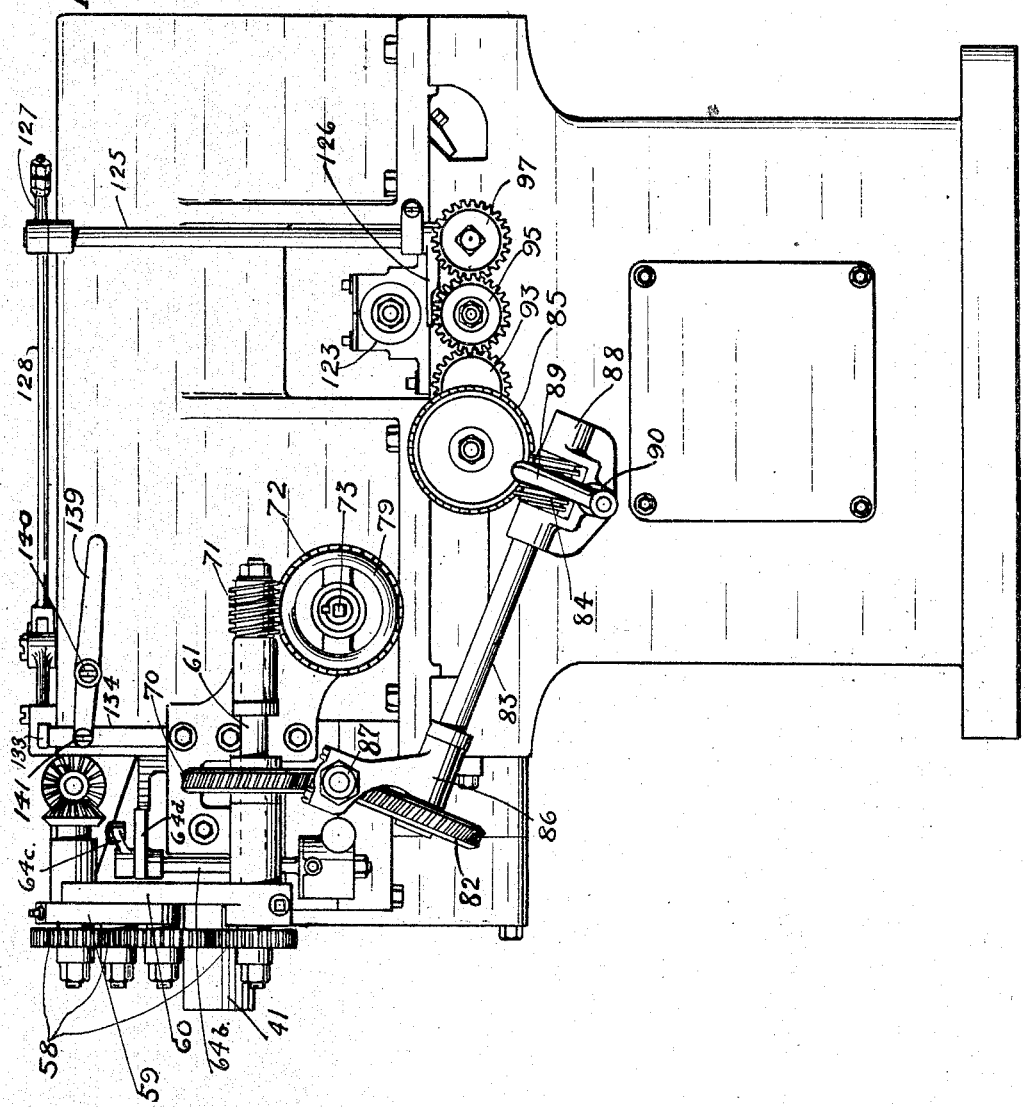

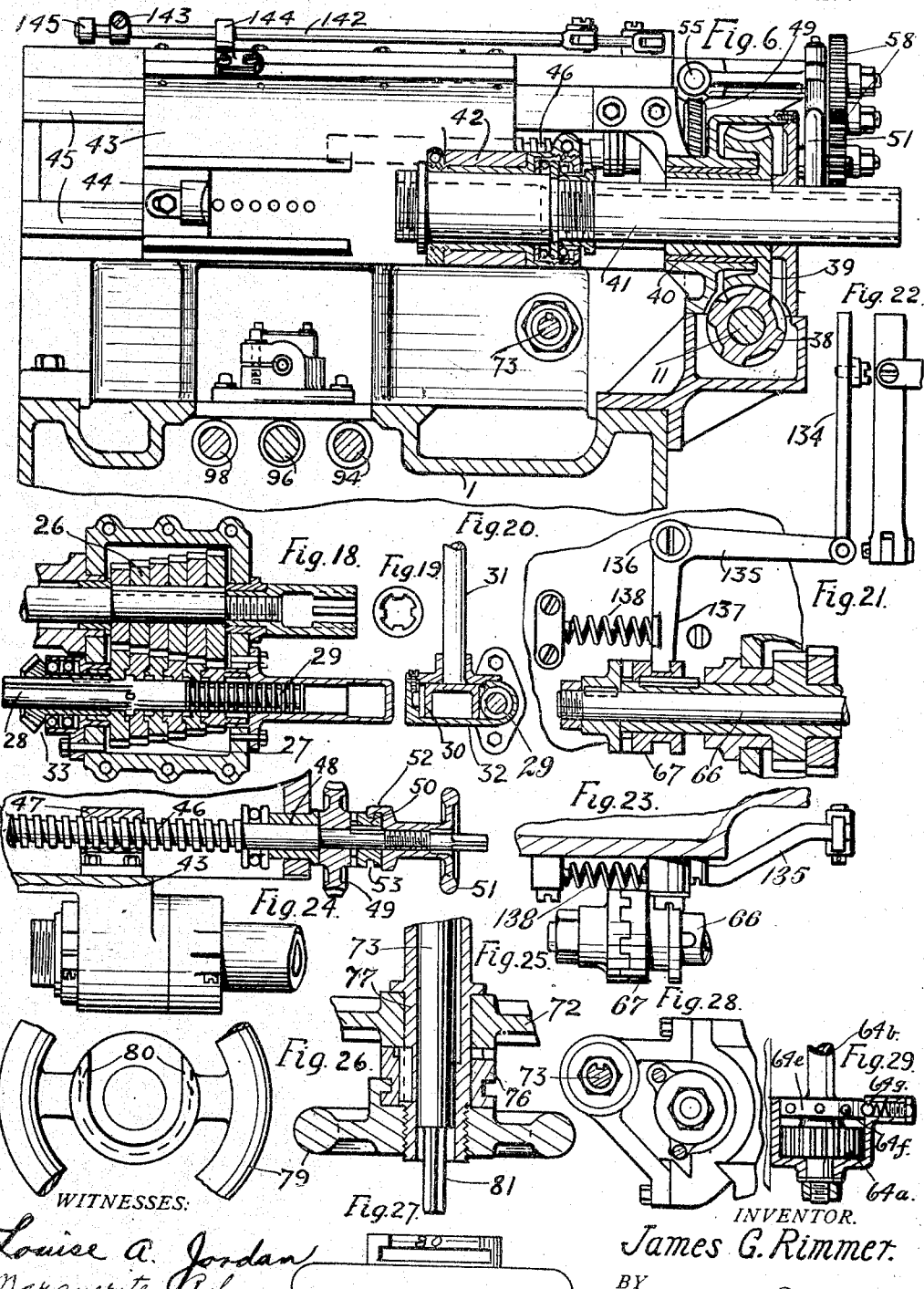

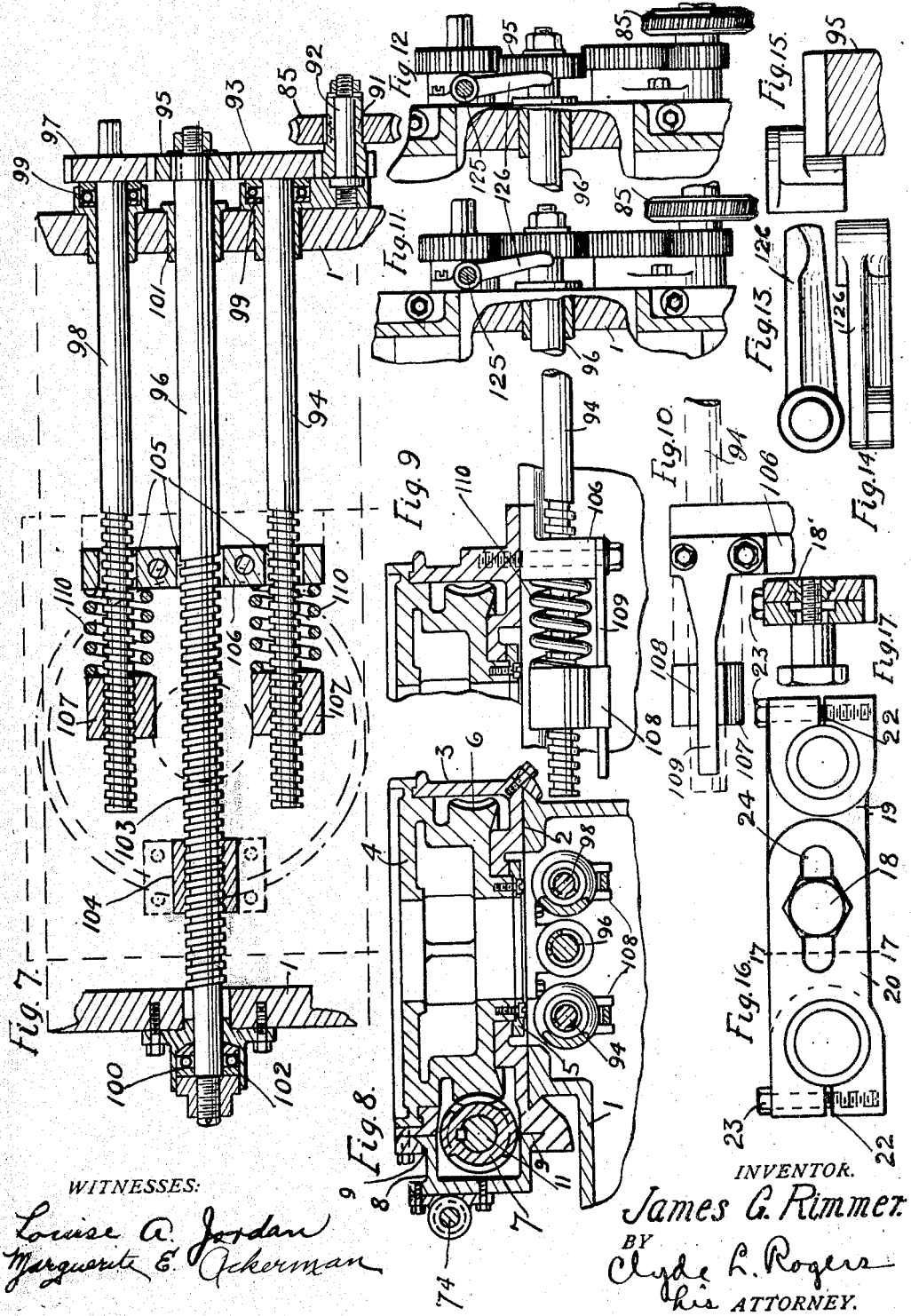
J. G. RIMMER.
GEAR CUTTING MACHINE.
APPLICATION FILED DEC. 26, 1912.
1,175,814.
Patented Mar. 14, 1916.
8 SHEETS—SHEET 7.
WITNESSES:
Louise A. Jordan
Marguerite E. Ackerman
INVENTOR.
James G. Rimmer
BY
Clyde L. Rogers
his ATTORNEY.

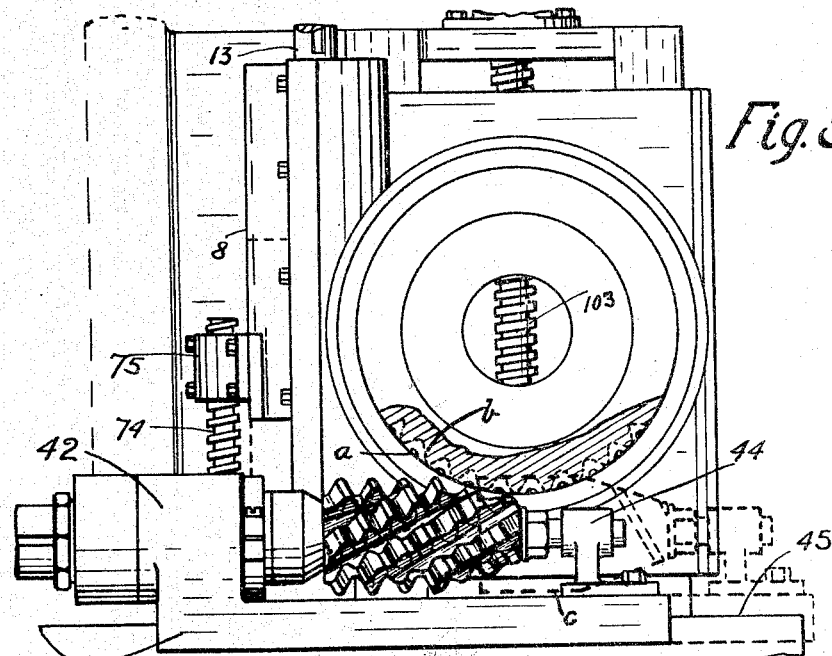
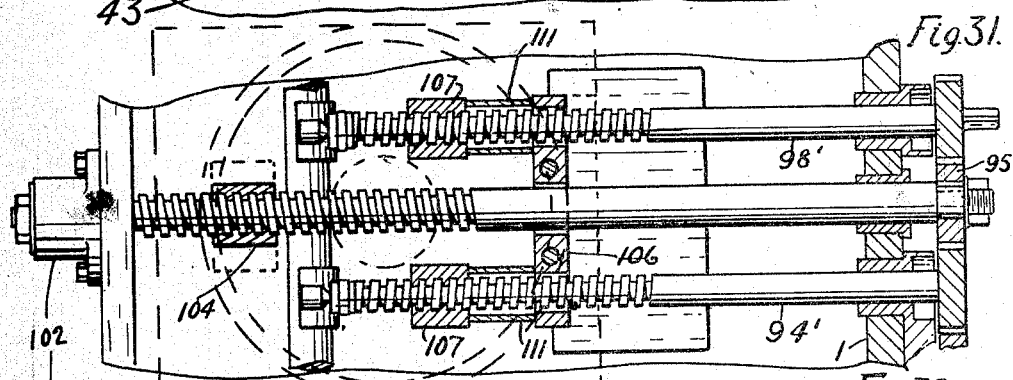
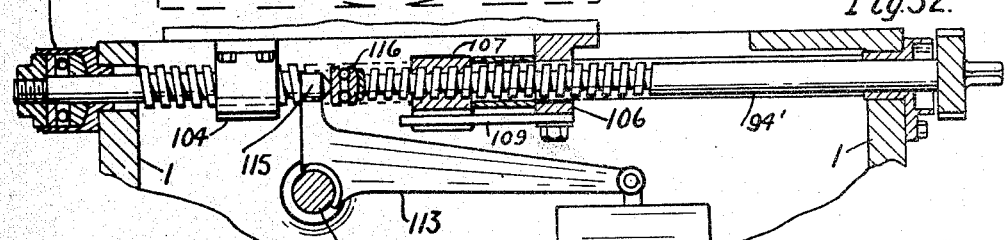

JAMES GORDON RIMMER, OF QUINCY, MASSACHUSETTS.

GEAR-CUTTING MACHINE.

1,175,814.  Specification of Letters Patent.  Patented Mar. 14, 1916.

Application filed December 26, 1912.  Serial No. 738,765.

*To all whom it may concern:*

Be it known that I, JAMES G. RIMMER, of Norfolk Downs, Quincy, in the county of Norfolk and State of Massachusetts, have invented certain new and useful Improvements in Gear-Cutting Machines, of which the following is a specification.

My invention relates to gear cutting machines of the type wherein the gear teeth are cut by a generating action with a definitely timed movement of the hobbing cutter or like cutting means relative to the work.

While adapted for general gear cutting uses the invention is more particularly designed for cutting worm gears, spiral gears and the various kinds of helical gears such as used in automobile drive trains.

One of the prime objects of the invention is to provide a simple and effective machine adapted to produce Hindley or hour-glass gears with a feed movement between the tool and work in a radial direction thereto, or by a simple shifting of connections without any disassemblage of parts to produce worm or helical gears, with the worm member, usually a taper hob having along with its turning movement, an endwise movement tangential of the worm wheel member, usually the blank being cut; though it will be understood that in a machine of this type the cutter and blank elements are interchangeable and by providing a worm wheel member with suitable cutting means, the machine is adapted to produce cut teeth on a blank occupying a position which the hob member usually occupies and having endwise feed imparted thereto.

A further object of the invention is to provide a machine arranged to permit any desired change in the driving and feed ratios of the cutter and blank to be made easily and quickly by a simple change in a single driving gear train without requiring the employment of a differential, or jack-in-the-box, or like expedients usually resorted to, and requiring elaborate computation or reference to an involved table.

A further object of the invention is to provide a machine wherein the blank is held up to the cutter with a constantly acting powerful spring or like pressure insuring even, steady action in cutting, with the elimination of the jumping and chattering which is often a serious difficulty in the cutting, as in the cutting of Hindley gears.

A further object of the invention is to provide a simple, and easily and conveniently operable means for effecting slight relative adjustments between the cutting member and blank while these are in operative position to take a small excess cut on one side of the teeth if desired, or to set the hob more centrally or otherwise.

A still further object of the invention is to provide driving gear trains and operative connections of a simple and powerful type to the working parts, these connections having a requisite change speed device and controlling means easily and conveniently operable.

The above and other objects and features of the invention will be better understood from the following detailed description taken in connection with the accompanying drawings and will be thereafter pointed out in the appended claims.

Referring to the drawings, Figure 1 is a horizontal section taken generally along the line 1—1 of Fig. 2; Fig. 1ª is a detail cross section of a shaft construction shown in Fig. 1; Fig. 2 is a side elevation of the machine; Fig. 3 is a plan view of the machine without the hob; Fig. 4 is a lengthwise vertical section generally along the line 4—4 of Fig. 3; Fig. 5 is an end view of the machine; Fig. 6 is a transverse section along the line 6—6 of Fig. 3; Fig. 7 is a horizontal section on line 7—7 of Fig. 4 showing the spring pressing elements; Fig. 8 is a transverse section showing the work table and its controlling connections on line 8—8 of Fig. 3; Fig. 9 is a fragmentary view partly in elevation and partly in vertical section showing the manner in which the spring pressing means acts on the table; Fig. 10 is a view from beneath of the parts shown in Fig. 9; Fig. 11 is a fragmentary elevation showing the driving connections for the table operating and screw coöperating controlling mechanism; Fig. 12 is a view similar to Fig. 11 but showing the parts in position for tripping an automatically operated disconnecting clutch; Figs. 13, 14 and 15 are detail views showing the construction of the clutch operating arm moved by the gears shown in Figs. 11 and 12; Fig. 16 is a detail elevation showing the mounting of the change gears which govern the relative turning movements of the blank and cutter; Fig. 17 is a transverse section thereof on line 17—17 of Fig. 16; Fig. 18 is a central section on line 18—18 of Fig. 1, showing the main change speed box from the prime driver; Fig. 19 is an end view showing a detail of a shaft connection in Fig. 18; Fig. 20 is a section on line 20—20 of Fig. 1; Fig. 21 is an enlarged section on line 21—21 of Fig. 1; Fig. 22 is a detail of a clutch operated lever shown in Fig. 21; Fig. 23 is a fragmentary view partly in plan and partly in section of the parts shown in Fig. 21; Fig. 24 is a fragmentary view partly in plan and partly in section, showing the means for moving the hob endwise; Fig. 25 is an enlarged detail section showing a hand wheel connection for controlling and disconnecting the clutch to the hob feed; Figs. 26 and 27 show said hand wheel in elevation and plan respectively; Fig. 28 is an end view taken in section on line 28—28 of Fig. 1; Fig. 29 is a detail section showing a part of the feed gear change; Fig. 30 is a partial plan view showing diagrammatically the manner in which the cutter attacks the blank; Fig. 31 is a view similar to Fig. 7 showing a modified form wherein weights are used instead of springs; and Fig. 32 is a vertical section of the form shown in Fig. 31.

The bed and supporting frame work of the machine designated generally 1 has horizontal slide ways 2 formed along an upper portion thereof on which is guided the slide carriage 3 in which the work table 4 is journaled in interfitting relation as best seen in Fig. 4 and held in place by a removable plate 5. This slide carriage is shown as formed as an upright tubular housing which incases a spiral drive gear 6 shown as integral with the work table and extending downward therefrom. The drive gear 6 is in driven engagement with a coöperating spiral gear 7 which is carried by a housing 8 having ends engaging the ends of the gear so that it is moved endwise thereby and the housing 8 is fitted for sliding movement in parallelism with the table movement on ways 9 formed on a front flange facing 10 shown as integral with the housing 3. The gear 7 is keyed to a shaft 11 which has at its inner end an end thrust collar fitted in bearings carried by the housing 8 as seen at 12, and the outer end of this shaft has long splines or key ways 13 formed thereon for driven engagement with coöperating formations in a hollow drive sleeve 14 which is journaled in bearings 15 of the machine frame work and has keyed thereto a driving gear 16. The gear 16 is the driven member of a train of change gears having as shown an intermediate 17 journaled on a bolt 18 carried by a pair of radius arms 20, 19, journaled respectively in bearings on the frame work concentric with those of the gear 16 and the driving gear 21 of the train. The construction of these radius arms is best shown in Figs. 16 and 17, they having split clamping ends 22 adapted to be drawn together by screw bolts 23 to grip them fixedly to their respective bearings. The axis bolt 18, which is threaded into a nut 18' set into the arm 19, and passes through a long slot 24 in the arm 20 is adapted to further insure the rigid holding of these arms with an intermediate 17 of any selected size in operative position, or a plurality of these intermediates if desired. The gear 21 is keyed on a shaft 25 journaled in the frame work and this shaft has keyed thereon a set of change gears 26 of varied sizes in a gear box on the frame, these gears 26 meshing with a coöperative series of gears 27 mounted on a driving shaft 28 and selectively engageable therewith by an endwise movement which brings it into keyed relation to any desired one of said gears as best seen in Fig. 18, this endwise movement being effected by a circular rack formation 29 at the inner end of said shaft engaged with a pinion 30 carried by a vertically extending hand operated shaft 31, the pinion 30 and rack 29 being inclosed in a suitable housing 32. The gears 27 as shown are nested within one another by flange collars at one side of each fitting into a recess seat at the adjacent side of the next and the end ones of these gears have collar bearings in the gear box so that the entire series have in effect, bearing support independent of the shaft 28 with which they are adapted to be brought in driven engagement. The shaft 28 has slidably keyed thereto a driving bevel pinion 33 actuated by a bevel pinion 34 on a transverse shaft 35 which is the prime drive shaft of the machine being suitably journaled in brackets 36 extending from one end of the frame work and having fixed thereto a belt wheel 37 or other operating means.

The shaft 25 supplies operative impulse for rotating the hob carrying spindle and also for effecting the feed of the work table in and out radially relative to the hob when cutting Hindley gears or other gears in the same manner, and this shaft also supplies impulse for feeding the hob endwise and simultaneously moving the gear member 7 endwise when the machine is working under such principle of operation. For rotating the hob spindle, the shaft portion 25' which is substantially an extension of shaft 25 has keyed thereto a worm 38 in driving engagement with a worm wheel 39 formed with a hollow sleeve 40 having bearing in the frame work. The hob spindle 41 has slidably splined engagement with this sleeve so that it may be moved in and out to effect an endwise movement of the hob tangentially of the wheel blank. This endwise sliding movement of the hob spindle 41 is effected by having a sleeve bearing 42 of a slide block 43 fitted between collars fixedly carried by the hob spindle. The slide block 43 which thus carries the hob, by means of the sleeve bearing 42 and an outboard bearing 44 for the outer end of the hob, is guided on slide ways 45 of the frame work crosswise of the machine and its endwise movement is effected by a screw rod 46 operatively engaging a nut member 47 carried by the slide block, this screw rod having journal bearings 48 arranged to hold it from endwise movement. The screw rod 46 is power driven by a worm wheel 49 loosely mounted thereon with clutch teeth at one side coöperative with a clutch collar 50 slidably splined on the screw rod and engaged for in-and-out movement by a hand wheel member 51 threaded on an extension of the rod. The hand wheel member 51 has an inwardly extending collar with a turned in flange 52 to engage a circular groove 53 in the clutch collar 50 so that this collar is positively moved both in and out of operative position by said hand wheel. The worm wheel 49 is driven by a worm 54 on a shaft 55 having fixed journal bearings, this shaft being in turn driven by bevel gearing 56 from a shaft 57 and a set of change gears 58 adjustably and replaceably mounted on a pair of arms 59, 60 journaled concentric with the end members of the gear train in like manner as the gears 16, 17, 21. The driving gear of the gear train 58 is fixed on a shaft 61 journaled in frame work bearings at the end of the machine and this shaft which not only thus provides impulse to move the hob endwise when required but also has connections for moving the spiral gear 7 endwise as later described is itself connected to receive driving impulse in the following manner. A tubular extension 25″ of the shaft portion 25′ has slidably keyed therein a clutching bar 62 adapted to be moved endwise to selectively drive any desired one of a bank of change speed gears 63 this bar having for its endwise movement a suitable circular rack and pinion device 64. The bank of change gears 63 engage the similar coöperative bank of gears 65 mounted on a shaft 66 and adapted to be operatively engaged therewith at will by a clutch device including a sliding clutch collar 67, this collar being operable by an automatic stop device to be presently explained. The banks of gears 63, 65 are incased in a suitable housing 68 which also furnishes bearings for the shaft elements. The shaft 65 has fixed thereon a worm 69 engaged to drive the worm wheel 70 fast on shaft 61. The shaft 61 is thus driven and in turn through a worm 71 fixed thereon and a worm wheel 72 engaged thereby drives a screw shaft 73, the threads 74 of which engage in nuts 75 fixed to the slide housing 8 of the spiral gear 7 for moving the same endwise. The worm wheel 72 has a clutch face at its outer side engageable by a clutch collar 76 slidably mounted on a sleeve 77 journaled in suitable bearings on the frame work having keyed engagement with the shaft 73 permitting sliding of said shaft therethrough. The shaft 73 is equipped with ball thrust bearings 78 intermediate its length, the stationary portions of these bearings being fixed to the work table and preventing endwise movement of the shaft 73 relative thereto. The clutch collar 76 is controlled by a hand wheel 79 threaded on the sleeve 77 and having a turned in flange engaging the collar in like manner as the flange 52, reference being had to Figs. 25, 26 and 27 to show the construction of these parts. It will be seen that the inturned flange is cut away on one side as at 80 so that the hand wheel member is capable of being assembled in operative relation with the clutch collar. It will also be noted that the end of shaft 73 extending out through the end of the sleeve 77 is squared as at 81 to receive a crank or like implement for turning the same by hand when desired.

The worm 69 which has the worm wheel 70 in driven engagement therewith above, also has its lower part in driving engagement with a worm wheel 82 fixed on a shaft 83 which extends downward and crosswise of the machine with a worm 84 fixed near its other end engaging a worm wheel 85 constituting the driver for the feed of the work table. The shaft 83 has its end which carries the worm wheel 82 journaled in a bracket 86 pivotally mounted concentric with the worm 69 as seen at 87. Its other end is journaled in a bracket 88 which is formed to hold the worm 84 from endwise movement and is itself mounted to have movement to swing the worm 84 into and out of engagement with the worm wheel 85 by the actuation of a handle 89 which controls an eccentric device 90 for moving the bracket up and down. Thus by turning the handle 89 the table feed may be thrown in or out as required, and the parts are arranged so that the action of gravity contributes to insure the complete throwing out of the worm when it is not turned into full inoperative position. The worm wheel 85 is fixed to the sleeve of a pinion 91 journaled on a stud 92 and engaging a gear 93 fixed at the end of a screw shaft 94, this gear driving a gear 95 fixed at the end of the main feed screw shaft 96 which gear 95 in turn drives a gear 97 on a screw shaft 98 which is the mate of the shaft 94 at the other side of shaft 96. The shafts 94 and 98 have their inner or right hand ends as seen in Fig. 7 provided with thrust bearings 99 to resist left hand endwise movement as seen in said figure and the central main feed shaft has thrust bearings 100 at its outer or left hand end to resist movement thereof to the right, it being noted that this screw has a small capability of endwise movement in the opposite direction, i. e., to the left in Fig. 7 as permitted by the spacing away of the gear 95 from the adjacent bearing collar 101 and as provided for by the extended collar 102 inclosing the thrust bearing 100. The threads 103 on the main feed shaft 96 engage a nut 104 fixedly depending from the work table slide carriage 3 and this and the screw rods 94, 98 extend through passages 105 provided therefor in a pressure transmitting block 106 also fixed to the work table slide carriage 3. As seen in Figs. 7, 8 and 9 the screw rods 94, 98 have fitted on the threaded portions thereof nut blocks 107, these blocks being held against rotation by having depending lips 108 engaged by bars 109 fixed to and extending back from the bottom of pressure transmitting block 106. Interposed between the backing nuts 107 and the pressure transmitting block 106, and encircling the rods 94, 98 are strong coil springs 110 which react against the pressure transmitting block 106 and exert a powerful pressure thence upon the table slide carriage tending to move it to present the work to the cutter. It will be observed that the threads on the rods 94, 98 are of opposite pitch to those on the rod 96 and as these rods are by the described gearing turned in an opposite direction from the rod 96, it will be understood that with properly proportioned gearing the backing nuts 107 will be caused to follow up the block 106 as it is moved along with the carriage by the action of the threads 103 of rod 96 on the nut 104, so that the springs 110 will maintain a substantially constant compression and pressure action upon the table. Thus the thrust bearing 100 at the inner end of rod 96 is kept engaged by the spring pressure transmitted through the nut 104 and tending to move rod 96 outward or to the right as seen in Fig. 7. The mounting of the rod 96 for small endwise movement not only is a feature of this resilient spring feed movement but it also is utilized for operating an automatic throw out mechanism in a manner to be presently described.

In Figs. 31 and 32 I show a modified form of the constant pressure feed mechanism typified by the springs just described and in this form instead of having springs interposed between the nuts 107 and the block 106, I interpose between these members spacing tubes or collars 111 and provide the constant pressure upon the work table by a heavy weight 112 carried by the long arms 113 of bell crank levers having a fulcrum bearing at 114 in the frame work and with their short arms 115 pressing against bearings 116 at the ends of the rods 94', 98'. With each of the forms described, as the work table is allowed to move forward by the turning of feed screw rod 96, the table and the work carried thereby are urged forward for the working cuts with a steady powerful pressure that eliminates the jumping and chattering which is often a serious difficulty as in the cutting of Hindley gears.

It will be observed that with each of the described forms the constant pressure element whether spring or weight remains in substantially fixed relation i. e., extent of compression of the springs is not varied, and when the weight is used it remains in an approximately constant position and does not require any large space for its housing. The limit of forward feed movement of the work table is determined by a micrometer stop device consisting in a stop pin 117 removably set into a clamping seat 118 provided therefor carried by the slide carriage, which coöperates with a pin 119 formed at the end of the micrometer screw 120 which is threaded through a bearing 121 therefor carried by the frame work. The micrometer screw rod 120 has fixed thereto a micrometer head 122 having graduations 123 readable in connection with the stationary piece 124 as is usual. With this construction of stop pins 117 selected of suitable lengths for different sizes of gears to be cut may be provided and a properly selected one of these for any particular size of gear may be inserted in the clamping seat 118. Then by adjusting the coöperating stop pin 119 by the micrometer device, the depth of cut to be made can be determined with precision and will be exactly the same for all gears cut with the same adjustment.

To provide an automatic stop for the feed when the table has reached the end of its working feed movement I provide the following mechanism: When the table feed is stopped by the stop pins 117, 119 coming together, the further turning of the rod 96 by the feed driving mechanism will cause it to move endwise inward or to the left in Fig. 7 carrying with it its gear 95 as seen in Fig. 12. A vertical rock shaft 125 is mounted in position so that an arm 126 fixed thereto will engage the inner face of gear 95. Thus as the gear 95 is moved in by the endwise movement of rod 96 the shaft 125 is rocked and in turn moves a bell crank lever 127 fixed to the top thereof which through a connecting rod 128 operates a bell crank lever 129 pivoted to the frame work at 130 with a spring 131 normally holding the parts so that the arm 126 is held pressed against the gear 95. The other arm of bell crank lever 129 is connected to operate a bar 132 which has its extremity 133 in position to normally hold down a vertical slide bar 134 which is connected to one arm of a bell crank lever 135 pivoted at 136, the other arm 137 of which engages the clutch collar 57 that controls the driving connection to the feed. A spring 138 is interposed to exert a constant pressure tending to disconnect this clutch and adapted to do so whenever the horizontal bar 132 is moved so that its end 133 releases bar 134 to move upward. A hand lever 139 is fulcrumed at 140 with a pivotal engagement at 141 with the vertical bar 134 to permit resetting of the clutch to active position. The described connections thus operate the stop device for disconnecting the feed at the completion of the feed movement of the work table when the machine is used according to this principle of operation and a large part of the same mechanism is utilized for throwing out the feed when the machine is working with the endwise fed, tapered hob. For this purpose the bell crank lever arm 129 has pivoted to its end a slide rod 142 mounted to extend along in parallelism with the hob. This rod carries an adjustable stop 143 for engagement by a finger projection 144 on the hob carriage 43, the top 143 being set to operate the feed disconnecting mechanism described as soon as the hob has been fed endwise to the requisite extent for completing the gear. A fixed stop 145 is carried at the end of the rod 142 to prevent excessive feed of the hob carriage.

It is often desirable to be able to set the cutter so as to take a little more off of one side of the teeth than normal and to permit this and also to permit setting of the hob to a more central position or other adjustment thereof relative to the work, I provide means whereby a small turning movement of the hob can be readily accomplished while the parts are in operative position and without disturbing the set-up of the machine. To this end the shaft section 25′ is connected to the shaft section 25 by a sliding joint 146 and the shaft portion 25′ has provision for endwise movement carrying with it the worm 38 which in such movement acts as a rack on the worm wheel 39 to impart turning adjustment to the hob. To effect such endwise movement of the shaft portion 25′, a thrust collar 147 is formed thereon for engagement at either side by thrust bearings 148 carried by an externally threaded collar 149 which engages internal threads in a cup member 150 having a stationary mounting on the machine. The collar 149 has a knurled flange 151 at its end to permit convenient adjustment by hand, so that by turning this collar the hob can be adjusted as required. The operating device 64 for controlling the change gears for the feeds has its gear member 64$^a$ carried on a vertical shaft 64$^b$ suitably housed and journaled, and with an operating handle 64$^c$ movable adjacent a designation plate 64$^d$. The shaft 64$^b$ also carries a disk 64$^e$ having a spaced apart series of socket seats 64$^f$ into which one side of a spring pressed ball 64$^g$ is adapted to snap to yieldingly hold the parts in position for rendering active any selective one of the feed changes. The vertical shaft 31 which controls the speed change gears 26, 27 of the initial driving train, has at its upper end an arm 31$^a$ carrying a spring pressed pin 31$^b$ coöperative with seats in a disk 31$^c$ for rendering active the proper connection for the desired speed.

Referring especially to Figs. 1, 2 and 4 it is to be observed that the construction of the frame work and mounting parts of my machine is specially designed with a view to economical manufacture and convenient assemblage. The body or frame base proper is formed plane with a straight edge along its side as seen in 152 and the several mounting and housing brackets 153, 154, 155, etc., are secured thereto in proper relative positions by suitable bolting. Likewise the top of the bed frame on which the slide ways 2 are formed is plane with a pedestal 156 secured at its end for supporting the slide ways 45 on which the hob carriage 43 is guided. The arrangement of the prime driving shaft 35 on brackets crosswise of the machine at one end thereof, with the change gears connecting the lengthwise extending parallel shafts 11, 25 exposed at the end of the machine over shaft 35, makes for compactness of the organization, and easy accessibility of the parts requiring frequent adjustment or change. In this connection it is to be noted that not only are the change gears 16, 21 which determine the driving ratio of the gears to be cut, thus easily accessible at the end of the machine, but the other change gear train 58 which requires to be properly selected for the size of the gear to be cut, is also in an easily reached position.

Considering first the principle of operation and manner of use of the machine when the work table is fed radially toward the hob, it is to be understood that for this use the hob is set substantially central of the work table feed line and the clutches 50 and 76 disconnected so that the hob is held from endwise movement by the stationary screw 46 and the spiral gear 7 is also stationary relative to the work table. A micrometer stop pin 117 is now selected of a proper length with reference to the size of the gear to be cut and the micrometer head 122 is adjusted to set the stop pin 119 to determine with precision the depth of teeth desired. The change gear train 16, 17, 21 is selected with reference to the number of teeth to be cut in the blank and in this connection it may be noted that I preferably form the spiral gear member 6, 7 and connecting gears 38, 39, so that shaft 41 revolves at three times the speed of work table 4, with gears 16 and 21 of equal size. This is done because the usual drive in automobile and like driving gearing is something near a 1 to 3 ratio, or greater, so that the blank will be rotated at the proper rate with the change gears 16, 21 of approximately the same size or with the driving gear 21 of this train the smallest which is more desirable. It will be understood that for the cutting of gears with any desired ratio and number of teeth the selection of the proper change gears 16, 21 is a simple matter; for example, supposing that gearing having teeth in the ratio 10:33 is to be cut; having in mind the 3 to 1 drive of gearing 6, 7, the change gear ratio becomes 10×3 or 30:33 which is the proper ratio for the teeth in the change gears. As these numbers would make the gear wheels smaller than desirable they may be multiplied by 2 or the teeth in gears 21, 16 may be 60 or 66 respectively. In like manner supposing gearing in the ratio 7:38 is to be cut, 7×3=21:38 and multiplying this ratio by 2 to make the gear wheels of convenient size the gears 21, 16 will have 42 and 76 teeth respectively. When the gear whether a Hindley or ordinary one as required is completed from the blank the micrometer stop pins 117, 119 coming together, stop the table movement and therefore the continuance of the feeding drive moves the central feed screw rod 96 endwise to the left in Fig. 7 causing gear 95 to swing arm 126 and through the described connections throw out the clutch 67 in the feed train, and thus stop the feed. It will be understood that the feed movement may be regulated as desired by the change gears 63, 65 in the feed train, and that the feed is in reality at all times that of the powerful springs 110 or the weight 112 which act to press the blank with an even, strong and steady pressure to the cutter which is a feature of great value and importance particularly in Hindley gear cutting where it is necessary to minimize the chattering and jumping effects. In this feeding operation the spiral gear 7 moves along with the gear 6 which it drives but without endwise movement relative thereto, the screw 74 being stationary and its splined shaft 73, as also the splined shaft 11, sliding through their sleeve bearings.

Taking up now the second principle of operation wherefor my improved machine is adapted, viz: that of cutting gears with an endwise fed tapered hob which is often advantageous and practicable the hob on its carriage 43 and the spiral gear 7 on its carriage 8 are for this operation simultaneously fed endwise, the gear 7 then acting on the gear 6 which it drives not only by its turning movement but also accelerating its movement with an action of a rack thereon and thus turning the blank with an accelerated compensating movement which corresponds to the endwise feed of the hob and causes the hob teeth to attack the blank properly throughout its range of endwise movement. For this purpose the clutches 50, 76 are thrown in so that the screws 46 and 74 which feed the hob carriage 43 and the spiral gear carriage 8, are driven. These screws and their driving worm gearing are preferably made alike so that in order to effect a proper endwise feed of the hob, having reference to the relative size of the blank being cut and of the spiral or worm wheel 6 it is only a matter of proportioning the change gears 58 so as to attain a driving ratio the same as that which the pitch diameter of the worm wheel to be cut bears to the work table worm 6. For example, supposing that the table worm 6 have a pitch diameter of 15″ and that the worm wheel to be cut is to have a pitch diameter of 10″; the ratio here being 15:10 or 1.5:1, the change gears 58 may have 60 and 40 teeth respectively, or 75 and 50 or any convenient number preserving the same ratio. Supposing a gear is to be cut with a pitch diameter of 9″ the ratio will here be 1.667:1. In this case the change gears may have 333 and 200 teeth respectively or may be compounded to attain the same ratio. With this setting of the mechanism the hob while it and the blank are being rotated by the described connections, is slowly fed endwise or from left to right as seen in Fig. 30, the work table having been previously moved up to proper position with a properly selected micrometer pin 117 abutting against pin 119. In this endwise feed of the hob the short teeth at the small, tapered end of the hob first attack the blank making a series of nicks around the circumference thereof as indicated at a. As the hob gradually progresses in its feed movement tangentially of the blank the longer teeth gradually enlarge the cuts until the final depth of the teeth to be produced is attained as indicated at b, the hob then occupying a position indicated in dotted lines at c. Thereupon as the cutting of the blank is finished the finger 144 of hob carriage 43 engages the stop 143 and throws out clutch 67 in the manner described. It will of course be understood that in this operation the screw drive shaft 83 is disconnected by the drop of worm 84 out of engagement with worm wheel 85. The adjusting device consisting in the threaded collar 149 containing thrust bearing 147 is available for adjusting the hob for the purpose as stated, with the machine connected for use in either of the ways described.

While I have described the machine as for cutting worm wheels or spiral wheels by the use of a hob or worm cutting member mounted on spindle 41 it is to be understood that this is merely illustrative and that the machine is also adapted to cut worms and like spiral gear members by placing the blank on spindle 41 and mounting cutting elements on the table 4. It is also to be understood that the particular embodiment of the invention disclosed is to be taken in an illustrative and not restrictive sense. I therefore refer to the appended claims rather than to the foregoing description to indicate the scope of the invention.

Having described my invention what I claim as new and desire to secure by Letters Patent is:

1. A machine of the kind described comprising two carriers, one for holding a gear cutting means and the other a gear blank, means for effecting a power feed movement of said carriers relative to each other in a direction radial of the blank, and means for effecting a power feed movement of the blank and cutter relative to each other in a direction substantially tangential to one of them, said two feeding means having provision for selective operation at will.

2. A machine of the kind described comprising two carriages, one for a worm wheel element and the other for a worm element, one of said elements being a blank and the other a cutter, means for rotating a gear blank and cutter in timed relation, means for power feeding the carriage of the worm wheel element radially of a blank carried thereby, and means for power feeding the worm element endwise thereof in a relation substantially tangential of said worm wheel element, said two power feeding means having provision for selective operation at will.

3. A machine of the kind described comprising two carriages, one for a gear cutter and the other for a gear blank, means for simultaneously rotating a cutter and blank carried thereby in timed relation, means for power feeding the blank carriage to present the blank to the cutter in a direction radial thereof and means for power feeding the cutter in a direction substantially tangential of the blank, said two power feeding means being selectively operative at will.

4. A machine of the kind described comprising two carriages, one for a worm wheel element and the other for a worm element, one of said elements being a blank and the other a cutter, means for power feeding said carriages selectively at will, and mechanism for rotating a blank and a cutter mounted on said carriages in timed relation, said mechanism having an element arranged to act as a rack for controlling the rotation of the worm wheel element to compensate for the movement of the worm element as imparted by the power feed of its carriage.

5. A machine of the kind described comprising a carriage mounted for sliding movement, a work table mounted for rotation thereon, means for power feeding said carriage in a direction radial of a blank carried thereby and for rotating the blank, a hob spindle mounted to hold the hob in a relation substantially tangential of a blank on said table, and means for power feeding a hob carried by said spindle endwise in definite timed relation to the rotation of the blank, said means having provision for operation with the work carriage feed inoperative or vice versa.

6. A machine of the kind described comprising a slidably mounted carriage, a work table rotatably mounted thereon equipped with a worm wheel, a worm mounted on said carriage for engagement with said worm wheel with provision for separate endwise movement at will, a hob mounted in substantially tangential relation to a blank on said work table with provision for endwise movement, and means for moving said hob and said worm endwise in definitely timed relation to each other and to the rotation of the blank.

7. A machine of the kind described comprising a slidably mounted carriage, a work table rotatably mounted thereon equipped with a worm wheel, a worm mounted on said carriage for engagement with said worm wheel with provision for separate endwise movement at will, a hob mounted in substantially tangential relation to a blank on said work table with provision for endwise movement, and like feed screws having provision to be rendered optionally inoperative for simultaneously moving said worm and hob endwise, said screws being interconnected by a change speed device and having provision for driving connection in definitely timed relation to the rotation of the blank and hob.

8. A machine of the kind described comprising a rotatably mounted work carrier, a hob spindle mounted in operative relation thereto, a shaft having connections for rotating the work table and having other connections including a worm for driving the hob spindle, and means for effecting a relatively fine adjustment of the hob relative to the work.

9. A machine of the kind described comprising a rotatably mounted work table, a rotatably mounted hob, intergeared driving connections for said work table and hob including a worm and worm wheel in the drive to the hob, and a threaded adjuster having provision for effecting relatively fine adjustments of said worm endwise for locating the hob in precise operative positions.

10. A machine of the kind described comprising a rotatably mounted work carrier, a rotatably mounted hob spindle, and means for driving the same in timed relation comprising a shaft connected to both, the connection to the work carrier being through change gearing and the connection to the hob being through a worm, said worm being mounted for endwise movement and means for effecting relatively fine endwise movement of the same to definitely adjust the hob relative to the work.

11. A machine of the kind described comprising a rotatably mounted hob, a work table mounted for feed movement toward and from the hob and radially of a blank carried thereby, and a micrometer stop device for limiting the feed movement of said table, said device consisting in a pin detachable and selective as to length for different sized blanks, and a coöperative pin having a micrometer head and adjuster connected therewith for determining the depth the teeth are to be cut.

12. A machine of the kind described comprising a table bearing a rotatably mounted gear blank carrier having provision for power feed movement toward and from the cutter, a stop pin detachably clamped to said table, said pin being selective to correspond with different sizes of blanks, and a coöperative stop pin mounted on a fixed part of the machine with a micrometer head and adjusting means adapted to determine the depth of the teeth to be cut in the blank.

13. A machine of the kind described comprising a rotatably mounted blank carrier, a rotatable cutter spindle and means for power feeding the blank carrier relative to the cutter in a direction radial of the blank, there being interposed in said means a separate and automatically operative device for pressing the blank strongly, evenly and constantly to the cutter to prevent chattering and jumping.

14. A machine of the kind described comprising a rotatably mounted work carrier, a rotatable hob spindle, and means for feeding said carrier relative to said spindle in a direction radial of a blank carried thereby, there being interposed in said means a device having self take-up provision for pressing the work to the cutter with a continuously acting movement, said take-up provision causing said device to remain in substantially the same relation to the feed throughout the range of work carrier movement to effect a strong, even pressure in any position thereof.

15. A machine of the kind described comprising a carriage having a work table mounted thereon, a cutter spindle mounted in operative relation thereto, and means for moving said carriage toward said spindle, said means consisting in a power driven feed screw mounted for small endwise movement in a direction opposite to that of the feed and engaging a nut on said carriage, and a pair of threaded shafts at each side of said feed screw in geared connection to said screw, having means coöperative therewith for strongly and evenly pressing the carriage in the direction of its feed movement, said means being formed to remain in substantially constant operative relation throughout the range of carriage movement.

16. A machine of the kind described comprising a cutter holder, a carriage for a gear blank mounted for movement toward and from the same, and means for effecting power movement of said carriage, said means consisting in a threaded feed shaft having power driving connections and engaging a nut carried by said carriage, said shaft having provision for small endwise movement in a direction opposite to that of the feed, a pair of threaded shafts at each side of said feed shaft in geared connection with said shaft, a nut engaged with each of said pair of shafts and held from rotation, backing means fixed to said carriage, and springs encircling said shafts and reacting between said nuts and said backing means to strongly and evenly press the carriage in the direction of its feed movement.

In testimony whereof I have affixed my signature, in presence of two witnesses.

JAMES GORDON RIMMER.

Witnesses:
CLYDE L. ROGERS,
LOUISE A. JORDAN.